Aug. 1, 1939.     P. S. BEAR ET AL     2,167,824
CONDITION CONTROLLER
Filed Oct. 12, 1936     4 Sheets-Sheet 2
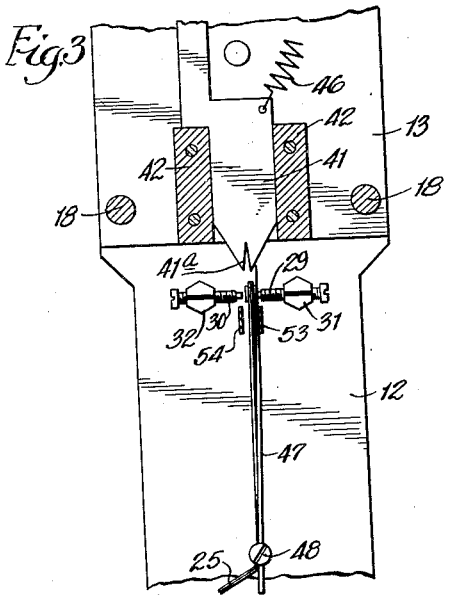
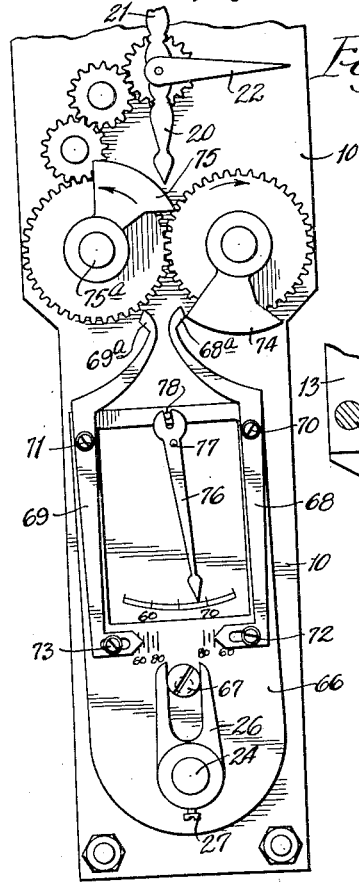
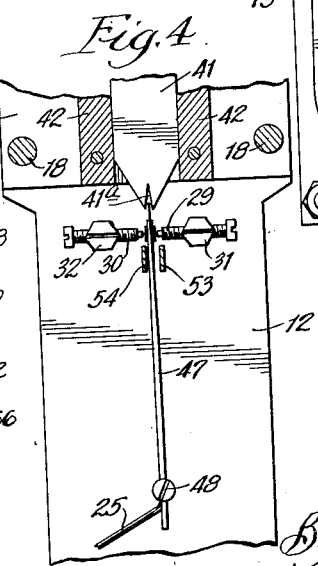
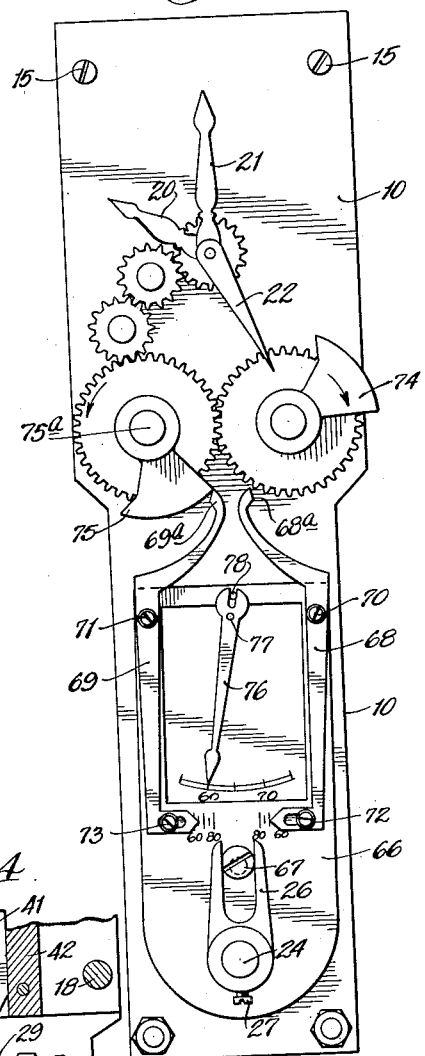
Inventors:
Paul S. Bear and
Roy Billings,
By Cumming & Cumming
Attorneys.

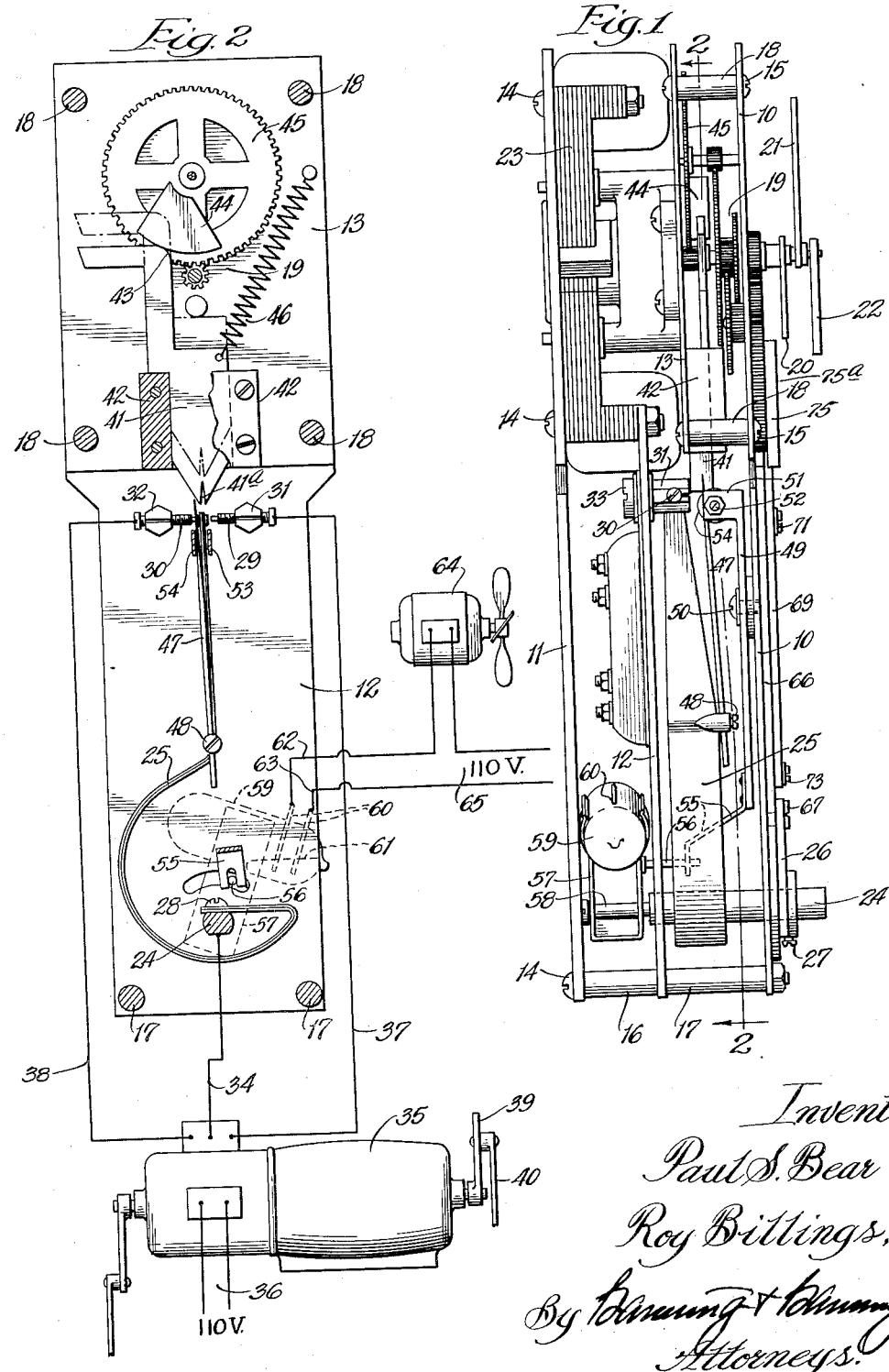

Aug. 1, 1939. P. S. BEAR ET AL 2,167,824
CONDITION CONTROLLER
Filed Oct. 12, 1936 4 Sheets-Sheet 3
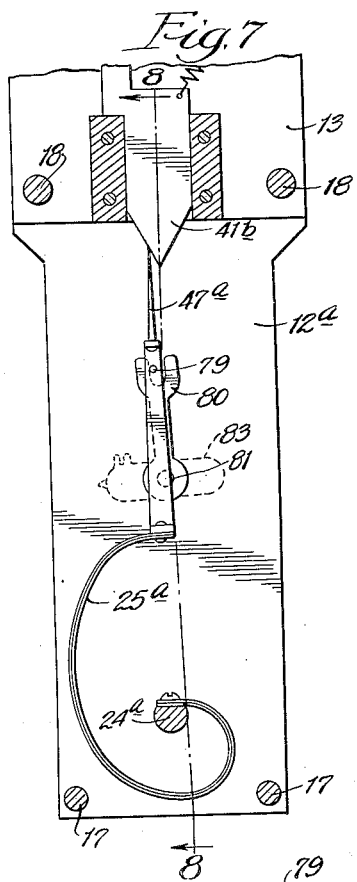
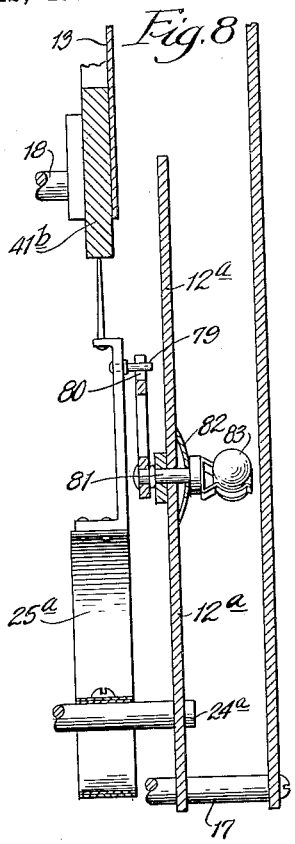
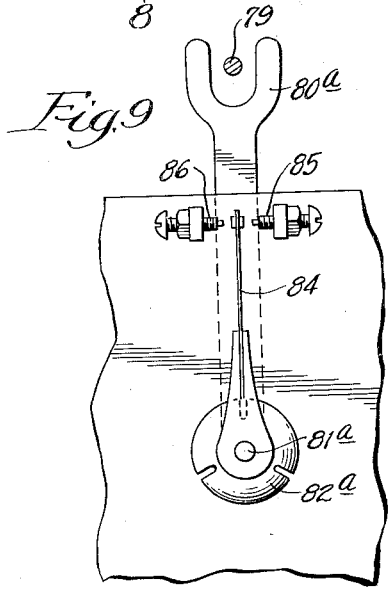
Inventors:
Paul S. Bear and
Roy Bittings,
By [signature]
Attorneys.

Aug. 1, 1939. P. S. BEAR ET AL 2,167,824
CONDITION CONTROLLER
Filed Oct. 12, 1936   4 Sheets-Sheet 4
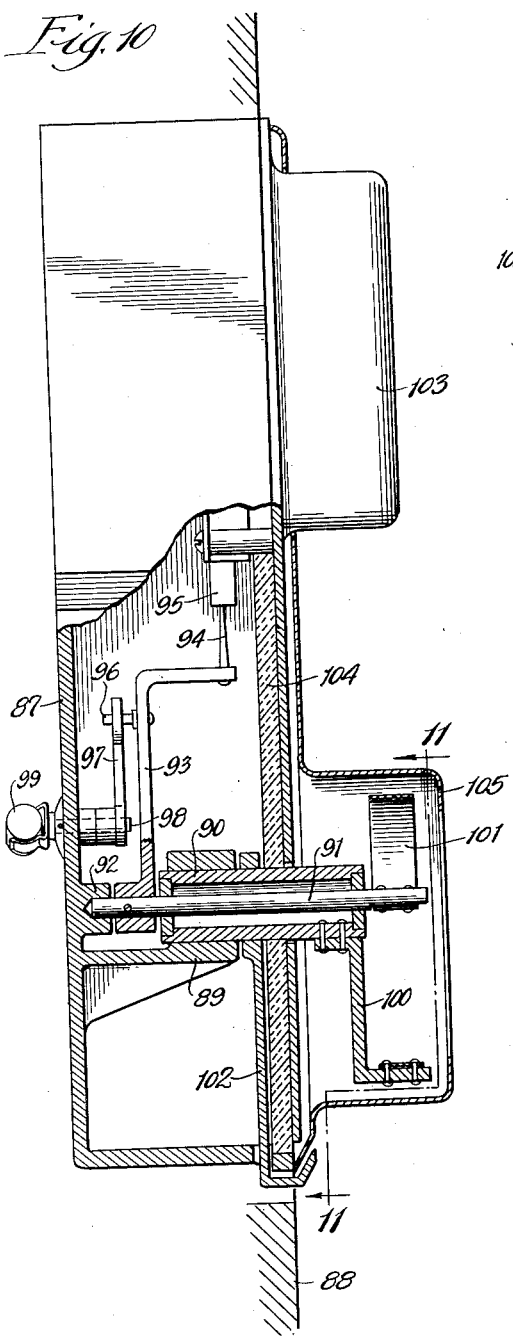
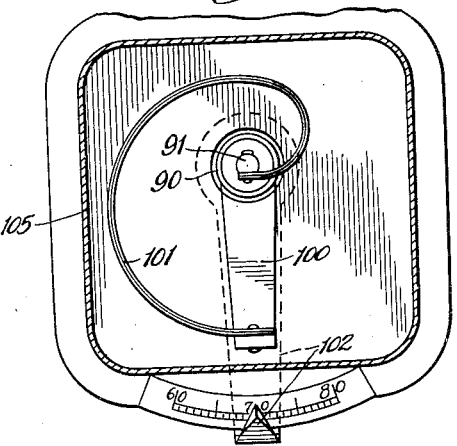
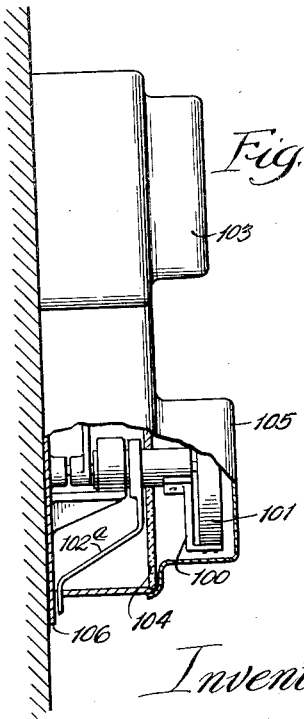
Inventors:
Paul S. Bear and
Roy Bittings,
By Binney & Binney
Attorneys.

Patented Aug. 1, 1939

2,167,824

UNITED STATES PATENT OFFICE 2,167,824

CONDITION CONTROLLER

Paul S. Bear, Elkhart, and Roy Billings, Wabash, Ind., assignors to Bucklen-Bear Laboratories, Inc., Elkhart, Ind., a corporation of Indiana Application October 12, 1936, Serial No. 105,194

8 Claims. (Cl. 200—139)

This invention relates to automatic devices for controlling various conditions (such as temperature, humidity, pressure, and the like) which are capable of influencing measuring instruments to operate one or more switches to vary those conditions to maintain predetermined levels therein.

An object of this invention is to provide a device of this type which is more readily responsive to changes in the controlled medium.

Another object is to provide such an apparatus which is simple, efficient, easily accessible for adjustment, and yet sufficiently rugged to meet all service requirements.

These and other objects, as will hereinafter appear, are accomplished by this invention which is fully described in the following specification and shown in the accompanying drawings in which—

Fig. 1 is a side elevation of a mechanism embodying one form of the invention;

Fig. 2 is a section on line 2—2 of Fig. 1 including a diagram of electrical connections;

Fig. 3 is a partial section similar to Fig. 2 showing the cam operated mechanism operating in a direction which is the reverse of that shown in Fig. 2;

Fig. 4 is a view similar to Fig. 3 showing the cam operated mechanism in a mid position;

Fig. 5 is a front elevation of the mechanism showing the automatic adjusting mechanism moved to a lowered setting position;

Fig. 6 is a partial view similar to Fig. 5 showing the same mechanism in the course of being moved to the higher setting position;

Fig. 7 which is a view similar to Fig. 2 shows a modified form of the thermostat as well as a modified form of switch mounting;

Fig. 8 is a partial section on line 8—8 of Fig. 7;

Fig. 9 is a partial enlarged view similar to Fig. 7 showing a modified form of electric switch;

Fig. 10 is a side elevation partly in section showing still another modified form of thermostat and switch and mountings therefor;

Fig. 11 is a vertical section on the broken line 11—11 of Fig. 10; and

Fig. 12 shows the mechanism mounted on a wall face as distinguished from a sunken mounting as indicated in Fig. 10.

The mechanism illustrated in Figs. 1 to 6, is capable of service for many purposes, one of which may be to maintain within fixed limits the temperature of a room by operating the controls, such as flues, fans and the like, of an oil burning furnace for heating the room. As shown, the mechanism comprises a frame having front and back plates 10, 11 respectively and intermediate plates 12, 13 which are held in place by suitable bolts as 14, 15 and spacers 16, 17, 18. A clockworks gear train 19, driving hour, minute and second hands 20, 21, 22, respectively, is driven preferably by a synchronous electric motor 23 in connection with a suitable source of alternating current (not shown). The entire mechanism is desirably protected by and enclosed within a suitable cover (not shown) which is removably secured in place.

A shaft 24 carrying a thermostat 25 is journaled in the plates 10 and 12 and is secured to an arm 26 by means of a set screw 27. This arm is movable to adjust the position of the shaft 24, as will later be described.

The thermostat 25 which may be a curved bimetal strip, as shown in Fig. 2, is secured to the shaft 24 by means of a screw 28. This strip is thus adapted to move back and forth in response to changes in temperature so that its upper end may move into engagement with either of the adjusting contacts 29 or 30 which are carried by suitable studs 31, 32 insulated from the plate 12 on which they are mounted, as by means of screws 33 (Fig. 1).

The shaft 24 connects through a lead 34 to the center tap of an alternating current reversing motor 35 which connects through leads 36 with a suitable source of alternating current supply. The adjusting screws 29, 30 connect through leads 37, 38, respectively, with the two outside contacts of the reversing motor 35.

Thus it will be seen that as the bimetal strip 25 moves to the right it will make contact with the screw 29, thereby closing the circuit through the leads 34, 37 so as to drive the motor 35 in one direction. This will cause the motor to shift its motor arm 39 in one direction thereby moving a link 40 so as to move some part controlled thereby. In this instance it may be assumed that closing of the circuit through the screw 29 will take place in response to a temperature rise which reaches the prescribed upper limit. In that case the link 40 may operate to close a draft, to shut off the feeding of fuel, such as oil or gas, or otherwise to act to partially shut down the furnace.

Following this the temperature in the room will drop more or less gradually depending on the setting of the various parts and upon the conditions under which the furnace is operating. This will gradually bring about a movement of the bimetal strip 25 to the left until finally its upper end engages the screw 30, thereby closing current through the leads 34, 38 and causing the motor 35 to run in the opposite direction, thereby moving the link 40 to a position wherein the operation of the furnace will again be speeded up.

It is often desirable, in addition to the above functions which can be performed through movable contacts such as those that have been described, to energize circuits which carry currents whose densities are much above those which could be passed through contacts like 29, 30. For this purpose we have provided apparatus which will be operated at fixed time intervals to move contacts into engagement, these contacts, however, being controlled by the bimetal thermostatic element. Thus in Fig. 2 is shown a V-shaped cam 41 slidable between guides 42, and having a rounded face 43 adapted to engage a cam follower 44 which is carried on a gear 45 driven by the gear train of the clockworks mechanism so as to make one revolution at a given speed, say eight revolutions per minute. Thus as the follower engages the rounded face of the cam it forces it down against the action of a spring 46 which tends to return the cam always to the dotted line position. As shown in Fig. 2, the cam is at the bottom of its movement. This cam has a narrow central notch 41ª and laterally sloping sides. A sharpened steel needle 47 is secured to a mid point on the bimetal strip 25 by means of a screw 48. This needle lies in the path of the V-shaped cam, as shown in Fig. 1. If the needle is at or near the central point it will pass up into the notch 41ª and no lateral movement of the needle with its associated bimetal strip will take place. If, however, the needle is at one side of center it will engage one of the sloping lateral surfaces of the cam as shown in Fig. 2, and will be moved to one side a predetermined amount. In so doing it will cause contact of the bimetal strip with one of the adjusting contacts. In this instance the bimetal strip is forced into contact with the screw 30 and the motor 35 is accordingly energized. In Fig. 3 the reverse is true, but in this case the needle is at the right of center with the result that the needle and its associated bimetal strip are forced to the right, thereby causing the bimetal strip to engage the contact 29. In Fig. 4 the needle is in a mid position and consequently the bimetal strip is not moved into engagement with either of the contacts 29, 30. It will be noted that the lower points of the cam 41 and the point of the needle are made very sharp so that there is no tendency for the point of the needle to catch on the cam. On the contrary, it always engages a smooth face along which it slides.

In addition to the switches, including the contacts 29, 30, the needle 47 serves to operate other switches which will now be described. A lever 49 is pivotally and frictionally mounted on a screw 50 (Fig. 1), and has upstanding lugs 51 through which extend screws 52 terminating in disc-like heads 53, 54 (Fig. 2) which lie one on each side of the needle 47. These screws may be nicely adjusted so as to place the inner faces of the heads at desired distances from the needle so that as the needle moves back and forth it will contact these heads thereby moving the lever 49 with it.

The lower or longer end of the lever 49 has an extension 55 which engages a pin 56 on a U-shaped member 57 which is pivotally mounted on a screw 58 which is secured into the end of the shaft 47. The member 57 carries a mercury switch 59 which has electrodes 60 which are connected by a globule of mercury 61 when the switch is in the dotted line position shown in Fig. 2.

Thus it will be seen that as the needle 47 is moved to the left in Fig. 2 the needle will contact the head 30, thereby shifting the lever 49 and rocking the mercury switch 59 over to the dotted line position wherein the mercury 61 will serve to electrically connect the electrodes 60. At the same time it will be noted that the upper end of the bimetal strip 25 will engage the contact 30. The electrodes 60 are insulated from each other and these are connected through flexible leads 62, 63 which are in series circuit with the windings of a motor 64 and a power line 65. The motor 64 may, if desired, drive a blower for speeding up combustion in a house-heating furnace, or the mercury switch 59 may be used for many other purposes. Likewise this switch may, if desired, be provided with electrodes at its opposite end similar to the electrodes 60 so that when the switch is rocked to the left the mercury 61 will serve to connect the other set of points.

Fig. 3 shows the position of the needle 47 when it has been moved to the right due to the action of the bimetal strip 25, in which position it is caught on the right hand side of the cam 41 thereby forcing the screw head 53 to the right. At the same time the bimetal strip is forced over into contact with the screw 29 thereby causing the motor 35 to reverse. In this position the mercury switch 59 will be rocked to the left to a position not shown. In Fig. 4 the needle 47 is in a mid position and passes into the narrow notch 41ª in the cam with the result that the bimetal strip does not make contact with either of the screws 29 or 30. At the same time, however, the lever 49 together with the switch 59 will remain in the position to which it was last placed by the action of the cam 41. It will be understood, however, that by varying the relative amounts of movement of the elements going to make up the switches and their parts which are operated by the pin 47, that various combinations of movements of these switches may be obtained.

It is often desirable in heating buildings, such as homes, public buildings, factories and the like, that the degree of heat to be maintained by these automatic controls may be predetermined. Thus, it may be desired to maintain an average temperature in a building to be heated at 70° F., between the hours of 6:00 A. M. and 10:00 P. M., and at say 60° F., between the hours of 10:00 P. M. and 6:00 A. M. To accomplish this and to provide a ready means of adjustment of the mechanism to maintain these temperatures within the predetermined limits, we have devised a mechanism now to be described, shown in Figs. 5 and 6. A plate 66 which is pivotally mounted on the shaft 24 and beneath the arm 26, carries a screw 67 with an eccentric head. This screw head lies in a radial slot in the arm 26 so that by rotating the screw the shaft 24 is rotated slightly with respect to the plate 66. This plate has two fingers 68, 69, which are pivotally mounted one on each side of the plate on screws 70, 71. The lower end of each finger is provided with a slot to receive a screw 72, 73. The lower end of each finger is also provided with a pointer which operates over a scale which may be graduated. Thus each of the fingers may separately be adjusted with respect to the plate 66 and locked in adjusted position by means of its screws.

The upper end 68ª of the finger 68 is adapted to lie in the path of and be engaged by a cam 74 which is driven by the clockworks mechanism, and preferably makes one revolution in twenty-four hours. The finger 69 has a similar upper end 69ᵃ which is likewise engaged by a cam 75 which is carried by a shaft 75ᵃ, the cams 74, 75 in this instance rotating in opposite directions.

The cam 75 in its movement encounters the end 69ᵃ and rocks the plate 66 about the shaft 24. In Fig. 5 the cam has just finished this rocking movement which, for example, may have the effect of automatically setting the control mechanism for a lower heat level. In this instance the mechanism may be set to place this low level in effect at 10:00 P. M. as here indicated. If the parts continue to rotate, the cam 74 will engage the upper end 68ᵃ of the finger and force it to the level as indicated in Fig. 6, say at 6:00 A. M. Thus from 10:00 P. M. to 6:00 A. M. a low temperature level may be maintained while from 6:00 A. M. until 10:00 P. M. a higher temperature level will be maintained.

To indicate these temperature levels we have provided a pointer 76 which is pivotally mounted at 77 on the plate 10 and which has a slot engaging a pin 78 on the plate 66. Thus as the plate 66 is moved from one side to the other, it rocks the pointer about the pin 78, thereby carrying the lower end of the pointer over the graduated scale as shown in Figs. 5 and 6.

In Figs. 7 and 8 is shown a modified form of the device in which a plate 12ᵃ has a shaft 24ᵃ extending therethrough for the support of a bimetal strip 25ᵃ. A cam 41ᵇ is slidably mounted as before to engage a needle 47ᵃ which is carried by the bimetal strip 25ᵃ. The needle carries a pin 79 which lies within a yoke member 80 and is adapted to engage either side of the cam as this pin is moved back and forth by the action of the bimetal strip and the cam 41ᵇ which, as shown, need not be formed with any central notch. The yoke 80 is secured to a shaft 81 which passes through the plate 12ᵃ (Fig. 8) and is frictionally mounted therein by means of a friction washer 82. This shaft carries a switch member such as a mercury switch 83. Thus, as this yoke is moved back and forth by means of the pin 79, it rocks the mercury switch from the operative to the inoperative position or the reverse. In this instance, however, the needle is moved either to the operative or the inoperative position, as there is no provision for a mid-position in the device elsewhere shown.

In Fig. 9 is shown a modified form of the device in which the yoke 80ᵃ is secured on a shaft 81ᵃ which has a friction washer 82ᵃ and carries a flexible member 84 which is movable by the yoke into engagement with either of the adjusting screw contacts 85, or 86. Thus, movement of the yoke 80ᵃ to one side will cause the member 84 to make a yielding engagement with one of these screw contacts, and that contact will be maintained until the needle 47ᵃ is thrown far enough to the opposite side to be forced to the opposite end of its swing, at which time the member 84 will make contact with the other screw contact. Thus, with this arrangement, the member 84 will be in engagement with one contact or other except in the instance when it is shifted from one to the other. It will be understood, however, that by varying the width of the slot and the size of the pin 79 that the member 84 may be made to maintain a central position when the needle is also in mid-position.

In Figs. 10, 11 and 12 is shown still another modified form of the device which may be substantially enclosed in a casing 87 so that it may be carried nearly flush with a wall 88. An arm 89 is carried by and may be formed integral with the casing 87 and this arm may have a sleeve 90 rotatable therein. A shaft 91 is rotatable within the sleeve 90 and in addition may have a bearing 92 in the bottom of the casing. This shaft carries an arm 93 and this in turn carries a needle 94 which engages a cam 95 similar to the cam 41. The arm 93 has a pin 96 operating in a bifurcated lever 97 mounted on a shaft 98 which is journaled in a suitable friction bearing in the casing 87 in the same way as is illustrated by the shaft 81 of Fig. 8. The shaft 98 carries a switch 99 which operates in the same way as the switch 83 of Figs. 7 and 8.

The sleeve 90 carries a lever arm 100 to which is secured one end of a bimetal strip 101, the opposite end of the strip being secured to the shaft 91. An operating lever 102 is secured to the sleeve 90 and extends through the bottom of the casing and terminates in a pointer which operates over a graduated scale as shown in Fig. 11.

A clockworks mechanism preferably driven by means of a synchronous electric motor is mounted in the upper portion of the casing in substantially the same way as that shown in Figs. 1 and 2, and has a suitable dial in a casing 103. The bimetal strip 101 stands in front of a heat insulating shield 104 and extends into the room and is enclosed by means of a removable cover 105. Thus it is exposed to the action of the surrounding air and is insulated from the heat of the wall, and particularly from the heat generated by the electric motor.

In Fig. 12 is shown still another modification of the invention in which a casing similar to that of Fig. 10 is shown mounted on the front of a wall. In this instance, the operating lever 102ᵃ is bent backward and downwardly so as to operate over a scale 106.

While we have shown and described but a few embodiments of our invention, it is to be understood that it is capable of many modifications. Changes, therefore, in the construction and arrangement may be made which do not depart from the spirit and scope of the invention as disclosed in the appended claims.

We claim:

1. In a device of the class described, a condition-responsive element, a member secured thereto, a pointed, double-faced cam movable at regular intervals into and out of engagement with the member, a switch operatively connected to the member so as to be moved thereby to an operative or an inoperative position depending on the position of the element, and means for preventing movement of the element by the cam when the element is in a mid-position.

2. In a device of the class described, a condition-responsive element, a member secured thereto, a pointed, double-faced cam movable at regular intervals into and out of engagement with the member, and a switch operatively connected to the member so as to be moved thereby to an operative or an inoperative position depending on the position of the element, the cam having a central notch to prevent movement of the element by the cam when the element is in a mid-position.

3. In a device of the class described, a condition-responsive element, a member secured thereto, a pointed, double-faced cam movable longitudinally of the member at regular intervals into and out of engagement with the member, a switch operatively connected to the member so as to be moved thereby to an operative or an inoperative position of the element, and means for preventing movement of the element by the cam when the element is in a mid-position.

4. In a device of the class described, a condition-responsive element, a member secured thereto, a pointed, double-faced cam movable longitudinally of the member at regular intervals into and out of engagement with the member, a switch operatively connected to the member so as to be moved thereby to an operative or an inoperative position of the element, the cam having a central notch to prevent movement of the element by the cam when the element is in a mid-position.

5. In a device of the class described, a condition-responsive element, a member secured thereto, a pointed, double-faced cam movable at regular intervals into and out of engagement with the member, a switch operatively connected to the member so as to be moved thereby to an operative or an inoperative position depending on the position of the element and means for preventing movement of the element by the cam when the element is in a mid-position, the switch being frictionally mounted and having a loose connection with the member so as to move only when the member is moved by the cam.

6. In a device of the class described, a condition-responsive element, a member secured thereto, a cam movable at regular intervals into and out of engagement with the member, a switch operatively connected to the member so as to be moved thereby to an operative or an inoperative position depending on the position of the element, a clockworks mechanism, and means operably connected to said element and operable by the clockworks mechanism for automatically setting the element for one operative range of positions during one predetermined period of time and for another operative range of positions during another predetermined period of time.

7. In a device of the class described, a condition-responsive element, a switch operably connected to the element so as to be moved thereby to open or closed position, and a cam operably associated with the element for periodically moving the element in one direction when the element has moved in that direction a predetermined distance from a mid-position but which does not move the element when it is within the predetermined distance of the mid-position.

8. In a device of the class described, a switch comprising a movable condition-responsive element and a second element in a fixed position adapted to receive contact from the movable element whereby to close a circuit therethrough, and a cam device movable through its cycle at regular intervals adapted in one position to transmit motion to the movable element whereby to close the switch and in another position to lock the movable element against motion whereby to hold the switch open.

PAUL S. BEAR.
ROY BILLINGS.